United States Patent
Bauer

(10) Patent No.: US 7,167,544 B1
(45) Date of Patent: Jan. 23, 2007

(54) TELECOMMUNICATION SYSTEM WITH ERROR MESSAGES CORRESPONDING TO SPEECH RECOGNITION ERRORS

(75) Inventor: Josef Bauer, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 6 days.

(21) Appl. No.: 10/130,991

(22) PCT Filed: Nov. 22, 2000

(86) PCT No.: PCT/DE00/04121

§ 371 (c)(1),
(2), (4) Date: May 24, 2002

(87) PCT Pub. No.: WO01/39176

PCT Pub. Date: May 31, 2001

(30) Foreign Application Priority Data

Nov. 25, 1999 (DE) ................................ 199 56 747

(51) Int. Cl.
*H04M 1/64* (2006.01)
*G10L 17/00* (2006.01)

(52) U.S. Cl. ................................ 379/88.01; 378/88.02; 704/246

(58) Field of Classification Search .. 379/88.01–88.04, 379/387.01; 455/563; 704/231, 246, 247, 704/270, 275
See application file for complete search history.

(56) References Cited

U.S. PATENT DOCUMENTS

| | | | | |
|---|---|---|---|---|
| 5,502,759 A | * | 3/1996 | Cheng et al. ............ | 379/88.02 |
| 5,684,921 A | * | 11/1997 | Bayya et al. ............ | 379/88.01 |
| 6,167,117 A | * | 12/2000 | Will ........................ | 379/88.03 |
| 6,167,118 A | * | 12/2000 | Slivensky ................ | 379/88.03 |
| 6,236,967 B1 | * | 5/2001 | Brotman et al. ......... | 379/88.01 |
| 6,260,012 B1 | * | 7/2001 | Park ........................ | 379/88.03 |
| 6,336,091 B1 | * | 1/2002 | Polikaitis et al. ........... | 704/275 |
| 6,370,504 B1 | * | 4/2002 | Zick et al. ................. | 704/251 |
| 6,629,072 B1 | * | 9/2003 | Thelen et al. ............... | 704/251 |

FOREIGN PATENT DOCUMENTS

| | | |
|---|---|---|
| DE | 195 15 123 | 8/1996 |
| EP | 1 081 683 | 3/2001 |
| GB | 2 102 171 | 1/1983 |
| WO | 87/07460 | 12/1987 |

OTHER PUBLICATIONS

Bub, Udo, "Anwendungsspezifische Online-Anpassung von Hidden-Markov-Modellen in automatischen Spracherkennungssystemen", Herbert Utz-Verlag, München 1999.

Naik, Denang, "Using Talker Location to Detect Suprious Utterances in Desktop Command and Control", IEEE, Apr. 21, 1997, pp. 3265-3268.

* cited by examiner

*Primary Examiner*—Ovidio Escalante
(74) *Attorney, Agent, or Firm*—Staas & Halsey LLP

(57) ABSTRACT

At least one voice parameter is analyzed during a voice recognition process. If the voice parameter(s) exceed a threshold, a message is issued to the user, which is specifically designed to request observance of the value range that has been predetermined for the voice parameter. The message prompts the user to re-input the command with a correction which has been adjusted to the voice parameter.

12 Claims, 2 Drawing Sheets

TELECOMMUNICATION SYSTEM WITH ERROR MESSAGES CORRESPONDING TO SPEECH RECOGNITION ERRORS

CROSS REFERENCE TO RELATED APPLICATIONS

This application is based on and hereby claims priority to German Application No. 199 567 47.6 filed on Nov. 25, 1999, the contents of which are hereby incorporated by reference.

BACKGROUND OF THE INVENTION

In the field of man/machine telecommunications, mainly approaches for evaluating the information content of human language are found, because particularly the spoken word is a very important way in people's everyday lives for communicating targeted information in an easy, rapid and very compact way. Owing to its widespread availability and of familiarity, the telephone is recognized as the transmission medium for the spoken word in everyday life. In order to facilitate and automate simple parts of the exchange of information between man and machine via telephone, voice recognition methods and apparatuses are being used for accepting orders in call centers or in telebanking information systems and order-receiving systems.

Previously known user-independent voice recognition methods and devices often differ considerably from people's spontaneous and natural interchange which is customary on the telephone. Malfunctions in the form of voice recognition errors are frequent with known systems, because known analysis methods react sensitively to particular features of the respective input signals, for example a user's manner of speaking. There is therefore a severe increase in the error rate in voice signals transmitted by telephone when, for example, there is severe background noise and when a person speaks very quickly or too slowly. This may produce virtually unusable results. In order to overcome this problem, it is known to request the user to speak clearly once more. An automatic announcement is then generated which may sound as follows: "I didn't understand you, please speak more clearly".

In order to improve voice recognition while maintaining as far as possible a natural speech rhythm in human speech, complex methods are proposed for particularly adapting the machine to each individual user, as presented for example in a summary in the book "Anwendungsspezifische Online-Anpassung von Hidden-Markov-Modellen in automatischen Spracherkennungssystemen" by Udo Bub, Herbert Utz Verlag, Munich, 1999, the title of which can be translated as "Application-specific online adaptation of hidden Markov models in automatic voice recognition systems".

SUMMARY OF THE INVENTION

The object of the present invention is to provide a method, a device and a telecommunications system for user-independent voice recognition, the acceptance by the user being increased by a natural method adapted to human use and/or by an apparatus for implementing this method and/or a corresponding telecommunications system.

This object is achieved by a method of analyzing a speech parameter during voice recognition, a request which is specifically directed at achieving re-compliance with the value range defined for the speech parameter being issued to the user when a threshold value is exceeded by the speech parameter. Whereas known methods demanded rigid adaptation to the system by the user so that the acceptance of the user drops, entirely owing to an associated lack of naturalness, a method according to the invention analyses, the quality of the incoming voice signal and requests the user, by a message which is specifically adapted by the speech parameter, to make a further voice input. The user is therefore selectively prompted to actively adapt his way of speaking.

Within the scope of a possible implementation of a method according to the invention, in a preferred embodiment the user can specifically be provided with the sentence "please speak more softly", in the same way as when he is conversing with another person.

In one development, a plurality of threshold values can also be defined for a speech parameter. When the different threshold values are exceeded, the meaningfulness of the message to be output can be appropriately adapted. Specifically in the case of the correction of the volume, presented by way of example above, this results in a correction bandwidth of "softer", "somewhat louder" to "louder".

A characteristic variable for the quality of the incoming voice signal, which can also be evaluated as an indication of the quality of the voice recognition, can be determined by reference to the speech parameter. A systematic error can also be detected by reference to persistent cases of the threshold values being exceeded. If, for example, such a case is detected on a transmission channel of a telecommunications system provided with a voice recognition apparatus according to the invention, channel measurement can be initiated within the scope of the described method. In this case, it is even possible to provide according to the invention that the user is requested to use a different telephone terminal when there are indications of a suspected fault.

A voice recognition apparatus according to the invention may include at least one device for processing digitized data of a voice signal, a speech-outputting device, devices for analyzing and monitoring a speech parameter, a device for determining when the speech parameter is exceeded, a device for generating and outputting a notification in digital or analog form, in particular of a speech synthesizing device, the notification being generated as a function of a threshold value for the speech parameter being exceeded, and a device for transmitting the indication to a user who generates the voice signal.

A telecommunications system according to the invention may include a multiplicity of telephone terminals, converters for digital/analog and analog/digital conversion and signal conditioning, a connecting line for each of the telephone terminals, a channel-bundling and channel-splitting unit, at least one switching office and a voice recognition device.

The present voice recognition apparatus using a method according to the invention is explained in more detail below with reference to the associated drawings, in which:

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
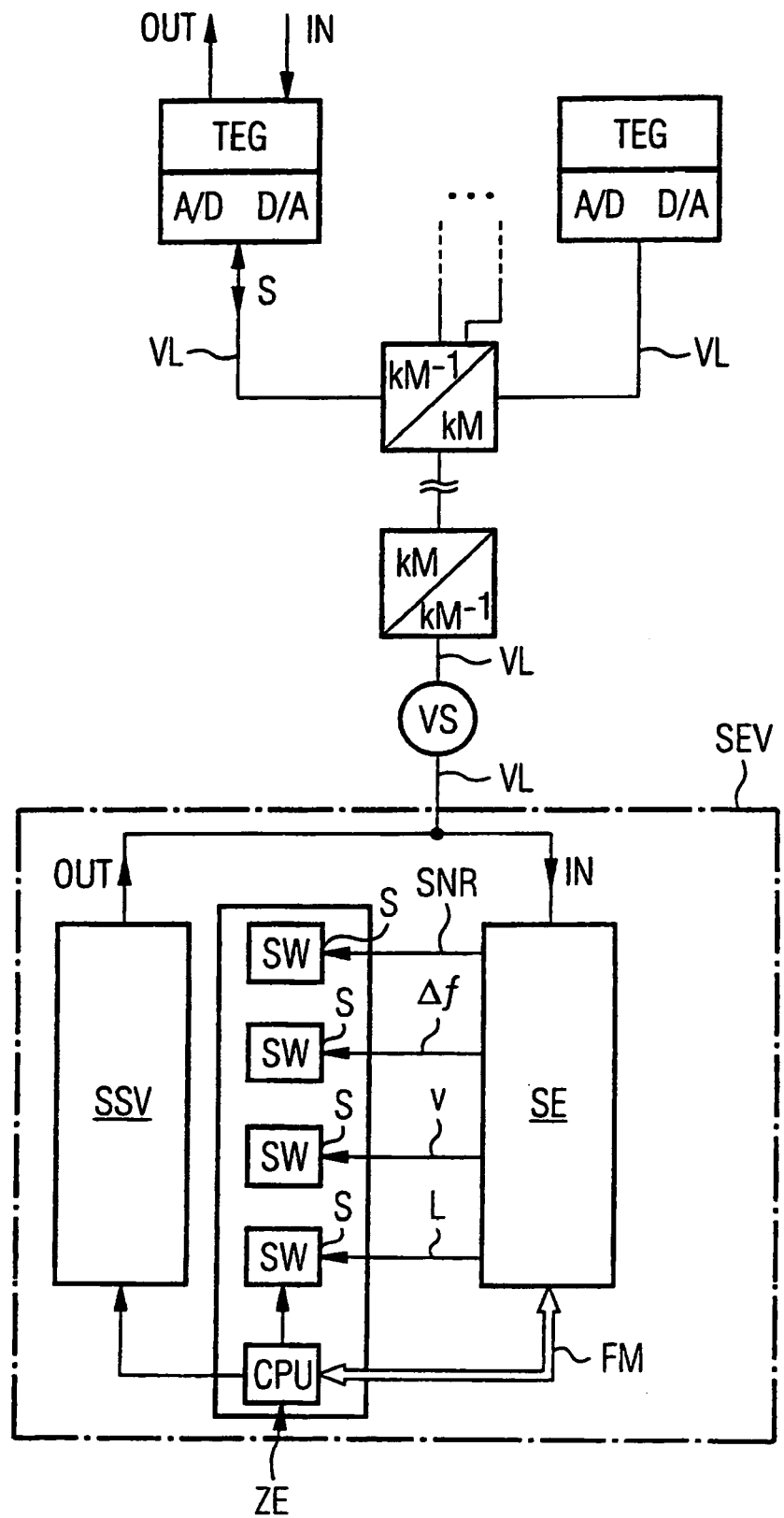
FIG. 1 is a basic circuit diagram of a telecommunications system according to the invention.

Reference will now be made in detail to the preferred embodiments of the present invention, examples of which are illustrated in the accompanying drawings, wherein like reference numerals refer to like elements throughout.

FIG. 1 is a schematic view of an apparatus according to the invention in the form of a telecommunications system which operates according to the method in accordance with the invention. A telecommunications system is illustrated which comprises a multiplicity of telephone terminals TEG which contain converters for digital/analog and analog/digital conversion A/D, D/A and integrated signal conditioning. The illustrated telephone terminals TEG can therefore be devices which operate in a digital fashion, inter alia commercially available EURO-ISDN devices according to the Deutsche Telekom standard. The telephone terminals TEG are connected to a connecting line VL for each of the telephone terminals TEG with channel-bundling and channel-splitting unit KM, $KM^{-1}$ so that the voice signals S are fed in digitized form to a voice recognition device SEV via a switching office VS on the connecting lines VL.

Figure 2:
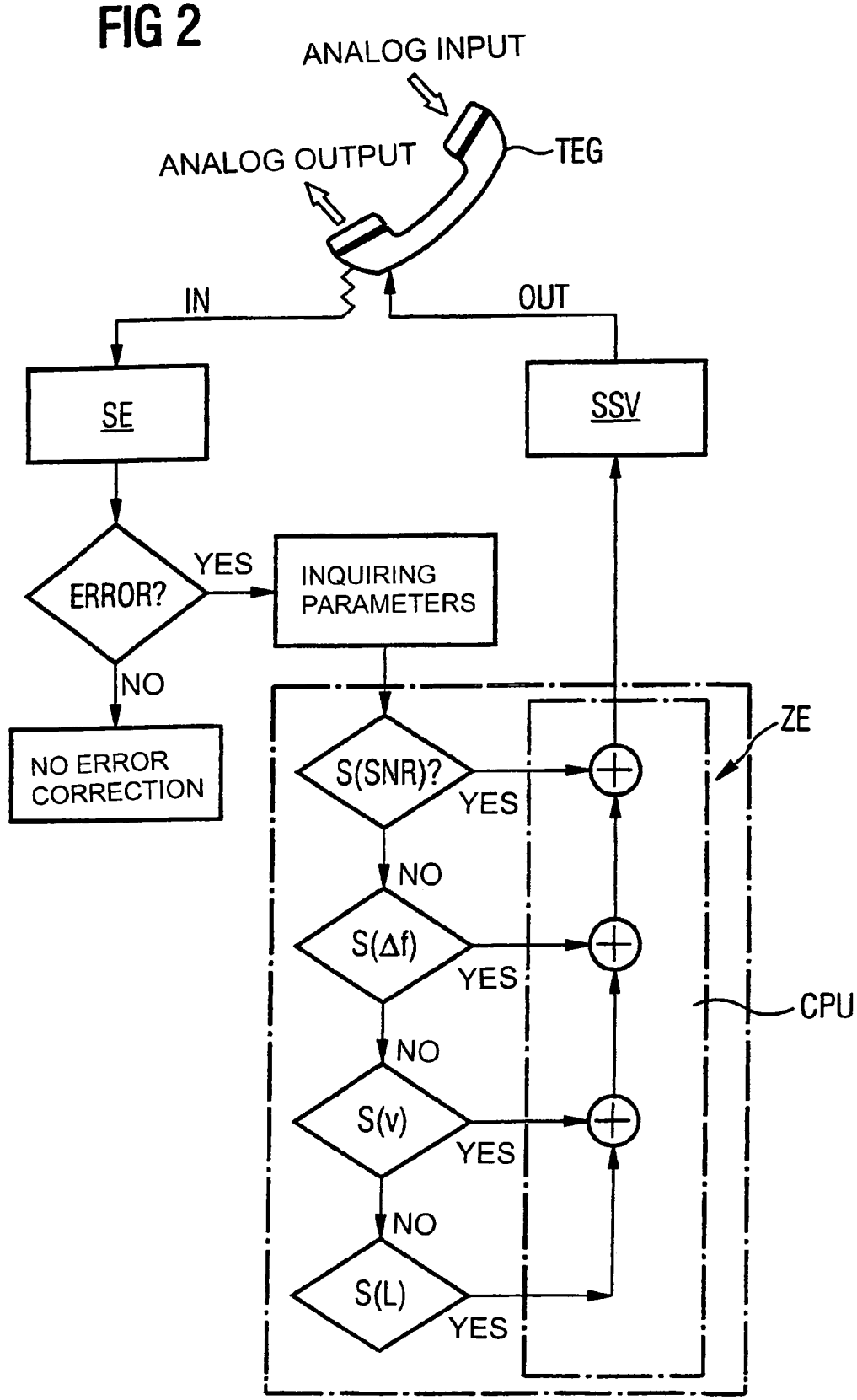
FIG. 2 is a flowchart of a voice recognition device.

The voice recognition device SEV is divided into a voice recognition device SE for processing the input signal IN and a speech synthesizing device SSV. Examination for errors during the voice recognition is carried out in the voice recognition device SE (FIG. 2). When an error occurs or when an error quotient is reached, an error message FM together with specific parameters determined during the voice recognition is transmitted to an evaluation logic unit. The individual parameters are examined here to determine whether a respective threshold value S is exceeded.

Properties of a voice signal which exert a significant influence on the error quotient during the voice recognition are represented as parameters. Some examples of such parameters are presented below:

Such a parameter is the volume L of the voice signal. The value of the parameter L can be acquired from the analog and the digital voice signal. The voice recognition device SEV cannot exert any influence on the input amplification of the voice signal at a telephone terminal TEG (FIG. 1), as these terminals are, due to the system, independent with fixed properties, both from the downstream transmission path and from the requirements of the voice recognition device SEV as a receiver.

The output of an audible message to the user can be made more precise by using incremental threshold values. For instance when the corresponding threshold values for the volume L are exceeded, the speaker is required to speak more softly, somewhat louder or louder.

A further parameter is the signal-to-noise ratio SNR of a voice signal. If the signal-to-noise ratio SNR in the voice signal IN present at the voice recognition device SE is too low, the voice cannot be recognized without error. There are in fact several possible ways of automatically improving the signal-to-noise ratio, for example specific digital filter methods whose filter parameter values are set in accordance with the current case, or else methods such as autocorrelation for subsequent improvement of the channel transmission properties.

When the threshold value for the signal-to-noise ratio is exceeded, the volume L can first be checked. If the volume is too low, the speaker is requested to speak louder even if the threshold value which applies to the volume has not yet been undershot. As a result, a larger signal-to-noise ratio is established. If the signal-to-noise ratio which results from this is still not sufficient or if the volume L is not low, unfavorable circumstances apply, for example the speaker may be speaking in a noisy environment (for example waiting rooms of railway stations and airports) or the transmission is subject to interference. The speaker is then requested, for example, to speak from a different location or a different telephone.

A further important parameter is the speaking speed v, which can be too high or too low. The speaking speed v is detected, for example, by measuring the phonemes over time, the term phoneme meaning the smallest linguistic basic unit of a language which distinguishes meaning. Like a person, a machine can no longer follow speech which is spoken too quickly and a correspondingly rapid succession of phonemes, as a result of which the error quotient rises greatly. In particular it is known that the detection rate when inputting numbers drops significantly as the speaking speed increases. On the other hand, in sentence recognition methods which process several words or entire sentences at once, an excessively low speaking speed also creates problems because the system must then wait for unusually long periods for the occurrence of an item of speech which it can process.

When the corresponding threshold values are exceeded, the speaker is requested to speak more slowly or more quickly.

Spectral properties of the voice signal are also a possible further source of an increased error quotient during voice recognition. The voice signal which is restricted to a narrow frequency band by the transmission by telephone has common features in all human speakers, which can be used in speech recognition. Differences may occur here owing to the microphones used in a particular case. However, because the microphones used in telephone terminals are always approximately of the same quality, this influence is negligible in comparison with the influence of the angle and the distance of the speaker from the microphone. From a difference in the volume and in the spectral properties of the voice signal it is possible to detect that a speaker is not speaking directly into a microphone from a short distance. For this reason, a spectral frequency shift $\Delta f$ is defined as a parameter, the value of the frequency shift $\Delta f$ being generated by a directional characteristic of the microphone together with an angle of incidence of the voice signal on the microphone.

The threshold values of the spectral frequency shift being exceeded thus means that the speaker has not positioned the microphone or the receiver of a telephone in front of his mouth. In such a case, the speaker is requested to position the microphone near to his mouth.

The aforesaid parameters consequently constitute a quality criterion for the voice signal IN to be recognized. In the embodiment in FIG. 1, the digitized voice signal IN which is received in the SEV is then input directly into the voice recognition unit SE. Here, an ongoing error check is carried out. If errors occur, the values of the signal-to-noise ratio SNR, spectral frequency shift $\Delta f$, speaking speed v and volume L parameters are supplied to a central unit ZE. Here, threshold value measuring devices SW are arranged which, when a respective threshold value S for the aforesaid parameters is exceeded, output their own control signal to a speech synthesizing device SSV. These steps all take place in real time in order to avoid delaying the input method. The sum of these control signals is processed in the speech synthesizing device SSV in that a message, which is for example audible, and may also be in more than one part, is built up from them. If a plurality of threshold values $S_i$ are provided, for example for the evaluation of the volume L, quantization can be determined in the central unit ZE. It is then determined, for example, that the input signal for correct detection is only slightly too soft. The message which is emitted in response to the corresponding control signal would be, for example: "Please speak slightly louder".

As illustrated in FIG. 2, the central unit ZE checks the threshold values of all the predetermined parameters before each speech output brought about by an error signal. Only the sum result of all the control signals which is compiled by a central processing unit CPU within the central unit ZE is to the speech synthesizing device SSV and converted there into a digital message which can be listened to after analog conversion. If, therefore, the central unit ZE also determines that the speaker is speaking too quickly, the prepared message to the user is: "Please speak slightly louder and more slowly".

In contrast to systems according to the prior art, the message which is output according to the invention contains an individually adapted message which is matched to the specific case and which leads to an improvement in the voice recognition in a targeted fashion.

In the present exemplary embodiment, the message is transmitted to the user in an audible form, namely as a synthetically generated sentence (a message OUT). In order to output the message OUT, a digital signal is generated in the speech synthesizing device SSV and connected via connecting lines VL with channel-bundling unit KM and channel-splitting unit $KM^{-1}$ to the corresponding telephone terminal TEG via the switching office VS, in order to reach the user with a specific message after analog conversion as S voice signal.

The message OUT can also be processed by the apparatus described above in some other way in the reverse direction instead of as an audible message. For example, the message can be displayed to the user on the telephone terminal TEG, for example on a screen telephone or a PC with an integrated telephone or a display.

In contrast to the signal flow illustrated in FIG. 2, the error analysis can also be separated from the voice recognition unit SE and arranged alongside it within the voice recognition device SEV. In this way, the computing power which is available to the voice recognition device SE can be used completely for this one task, because the analysis of the results for errors can be carried out in parallel to this in a continuous process by examining the parameters mentioned above for cases in which threshold values are exceeded in threshold value measuring devices SW. In cases in which threshold values are exceeded, it is then possible to carry out error analysis selectively so that in the user-independent system described the entire loading on a system remains acceptable even with tight threshold values. A further possibility is to predefine input threshold values which are adapted quickly on a case-by-case basis. Thus, overall, reliable convergence with low error quotients while making a minimum number of requirements of the user and/or of system-internal control operations is achieved.

The invention has been described in detail with particular reference to preferred embodiments thereof and examples, but it will be understood that variations and modifications can be effected within the spirit and scope of the invention.

The invention claimed is:

1. A telecommunications system with speech recognition, comprising:
a multiplicity of telephone terminals;
converters, coupled to at least some of said telephone terminals to provide digital/analog and analog/digital conversion and signal conditioning;
channel-bundling and channel-splitting units coupled to said telephone terminals, via said converters when coupled thereto; and
at least one switching office coupled to at least one of said channel-bundling and channel-splitting units and including
a speech recognition device to analyze and monitor speaking speed in a voice signal received from a user via the at least one of said channel-bundling and channel-splitting units;
a threshold device, coupled to said speech recognition device, to determine when the speaking speed is outside a predetermined range; and
a speech synthesizing device, coupled to said threshold device, to generate an individually adapted notification in at least one of digital and analog form when the speaking speed is outside the predetermined range and to output the individually adapted notification via the at least one of said channel-bundling and channel-splitting units.

2. A speech recognition method, comprising:
determining during speech recognition whether an error has occurred in the speech recognition;
analyzing, if a corresponding error is determined, at least one speech parameter;
determining compliance by monitoring speaking speed within the input voice signal and comparing the speaking speed with a threshold value range defined by at least one of a maximum threshold value and a minimum threshold value; and
issuing to a user a message, individually adapted to provide compliance with the threshold value range specified for the speaking speed, to prompt re-input by the user with correction adapted to the speaking speed.

3. The method as claimed in claim 2, wherein said determining compliance includes monitoring a signal-to-noise ratio of an input voice signal.

4. The method as claimed in claim 3, wherein said determining compliance includes monitoring a specific range of a frequency spectrum of the input voice signal.

5. The method as claimed in claim 2, wherein said determining compliance includes monitoring the volume of the input voice signal.

6. The method as claimed in claim 2, wherein said determining compliance includes monitoring a plurality of speech parameters simultaneously.

7. The method as claimed in claim 6, wherein each of the speech parameters is monitored in a digitized voice signal.

8. The method as claimed in claim 2, wherein said issuing of the request is performed audibly as a spoken short record played by a speech synthesizing device.

9. The method as claimed in claim 2, wherein said determining compliance uses more than one threshold value to select among a plurality of messages to be issued to the user.

10. The method as claimed in claim 9, wherein said determining compliance of the speaking speed is performed in real time from input and processing of a voice signal.

11. A speech recognition apparatus, comprising:
a speech recognition device to analyze and monitor speaking speed in a voice signal received from a user;
a threshold device, coupled to said speech recognition device, to determine when the speaking speed is outside a predetermined range;

a speech synthesizing device, coupled to said threshold device, to generate and output an individually adapted notification in at least one of digital and analog form when the speaking speed is outside the predetermined range, and an output device, coupled to said speech synthesizing device, to transmit the individually adapted notification to the user who generated the voice signal.

12. The apparatus as claimed in claim 11, wherein said speech recognition and output devices are coupled to at least one of a digital telephone system and an analog telephone system to receive the voice signal from and to transfer the individually adapted notification to the user who generated the voice signal.

* * * * *